United States Patent
Norden et al.

(10) Patent No.: US 7,876,759 B2
(45) Date of Patent: Jan. 25, 2011

(54) QUALITY OF SERVICE WITH CONTROL FLOW PACKET FILTERING

(75) Inventors: Hahn Vo Norden, Houston, TX (US); Hubert E. Brinkmann, Spring, TX (US); Paul V. Brownell, Houston, TX (US); Kenneth T. Chin, Cypress, TX (US); James Dinh, Austin, TX (US); David L. Matthews, Cypress, TX (US); Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 11/775,967

(22) Filed: Jul. 11, 2007

(65) Prior Publication Data

US 2009/0016348 A1 Jan. 15, 2009

(51) Int. Cl.
H04L 12/56 (2006.01)
(52) U.S. Cl. ..................................... 370/392
(58) Field of Classification Search ................. 370/352, 370/235, 237, 394, 332, 354, 223, 401; 455/411, 455/556; 709/238, 224, 226
See application file for complete search history.

(56) References Cited

U.S. PATENT DOCUMENTS

| | | | |
|---|---|---|---|
| 6,631,122 B1 * | 10/2003 | Arunachalam et al. ...... | 370/332 |
| 6,636,485 B1 * | 10/2003 | Fijolek et al. ............... | 370/252 |
| 6,757,521 B1 * | 6/2004 | Ying ........................ | 455/67.11 |
| 6,768,738 B1 * | 7/2004 | Yazaki et al. ................ | 370/392 |
| 6,781,991 B1 * | 8/2004 | Anderlind ................... | 370/394 |
| 6,816,903 B1 * | 11/2004 | Rakoshitz et al. ............ | 709/226 |
| 7,042,848 B2 * | 5/2006 | Santiago et al. ............. | 370/253 |
| 7,042,992 B1 * | 5/2006 | Falcone et al. ........ | 379/114.21 |
| 7,076,552 B2 * | 7/2006 | Mandato .................... | 709/226 |
| 7,206,860 B2 * | 4/2007 | Murakami et al. .......... | 709/238 |
| 7,286,535 B2 * | 10/2007 | Ishikawa et al. ............ | 370/392 |
| 7,333,798 B2 * | 2/2008 | Hodge ........................ | 455/411 |
| 7,349,340 B2 * | 3/2008 | Sahai et al. ................. | 370/235 |
| 7,359,364 B2 * | 4/2008 | Yuhan et al. ................ | 370/341 |
| 7,474,666 B2 * | 1/2009 | Kloth et al. ................. | 370/401 |
| 7,483,379 B2 * | 1/2009 | Kan et al. ................... | 370/237 |
| 7,486,614 B2 * | 2/2009 | Yu .............................. | 370/223 |
| 7,505,567 B1 * | 3/2009 | Eslambolchi et al. .... | 379/14.01 |
| 7,535,845 B2 * | 5/2009 | Bou-Diab et al. ........... | 370/238 |
| 7,539,132 B2 * | 5/2009 | Werner et al. .............. | 370/229 |
| 7,558,283 B2 * | 7/2009 | Zheng ........................ | 370/437 |
| 7,664,097 B2 * | 2/2010 | White et al. ................ | 370/352 |
| 2003/0115266 A1 * | 6/2003 | Sweet et al. ................ | 709/203 |
| 2004/0037269 A1 * | 2/2004 | Lundin ....................... | 370/352 |
| 2004/0153551 A1 * | 8/2004 | Haumont .................... | 709/228 |
| 2004/0190553 A1 * | 9/2004 | Ward et al. .................. | 370/474 |
| 2004/0193711 A1 * | 9/2004 | Marilly et al. .............. | 709/224 |
| 2005/0135387 A1 * | 6/2005 | Rychener et al. ........... | 370/401 |
| 2006/0007913 A1 * | 1/2006 | Botkin et al. ............... | 370/352 |
| 2006/0029096 A1 * | 2/2006 | Babbar et al. .............. | 370/466 |
| 2006/0104230 A1 * | 5/2006 | Gidwani ..................... | 370/328 |
| 2007/0105589 A1 * | 5/2007 | Lu .......................... | 455/556.2 |
| 2008/0159287 A1 * | 7/2008 | Nagarajan et al. .......... | 370/392 |

(Continued)

Primary Examiner—Thong H Vu

(57) ABSTRACT

A system is provided comprising a fabric coupling together a plurality of computing devices, wherein the fabric transfers a stream of packets between the computing devices. Each computing device comprises a Quality of Service ("QOS") filter that monitors incoming packets to filter out packets of a maintenance type and permit transfer of packets of a transaction type.

23 Claims, 5 Drawing Sheets

U.S. PATENT DOCUMENTS

2008/0165702 A1* 7/2008 Bienas et al. ............... 370/254
2008/0192752 A1* 8/2008 Hyslop et al. .......... 370/395.21
2009/0100014 A1* 4/2009 Gedik et al. ................... 707/3

* cited by examiner

Packet Header

| Byte | Description |
|------|-------------|
| 0 | Packet Format type |
| 8 | Message type |
| 10 | Vendor Identifier |
| 11 | Vendor Identifier |
| 12 | Control |
| 17 | Credit data |
| 18 | Credit data |
| 19 | Credit data |

FIG. 2A

QUALITY OF SERVICE WITH CONTROL FLOW PACKET FILTERING

BACKGROUND

Peripheral Component Interconnect (PCI) is a parallel bus architecture that has become the predominant local bus for various computing platforms. The implementation of the PCI technology has come close to its practical limits of performance and is not easily scaled up in frequency or down in voltage. PCI Express is another architecture utilizing point-to-point transmission, having a higher speed, and which is scalable for future improvements.

A PCI Express link is built around dedicated unidirectional couples of serial (1-bit), point-to-point connections known as "lanes." PCI Express is a layered protocol, consisting of a Transaction Layer, a Data Link Layer, and a Physical Layer. In addition to data packets transferred from one device to another via the PCI Express, various other packets are also transferred, such as configuration packets and flow control packets. Thus, some bandwidth allocated for data packet transfer is expended in transferring management configuration cycles and flow control update packets, which in some instances results in traffic blockages in critical data paths.

Additionally, bandwidth allocated for data transfer for a particular device coupled to the PCI Express link may go unused, further contributing to system inefficiency.

BRIEF DESCRIPTION OF THE DRAWINGS

For a detailed description of exemplary embodiments of the invention, reference will now be made to the accompanying drawings in which:

FIGS. 2A-C illustrate various packet header bytes in accordance with various embodiments of the present disclosure;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A fabric, such as PCI Express fabric, delivers packets from multiple devices (i.e., blades), and also utilizes bandwidth to transfer management configuration cycles and flow control update packets. The present disclosure enables filtering out such maintenance packets to avoid blocking critical data paths. Such filtering may be accomplished without software changes at the I/O device driver level, and is transparent at the operating system level. Implementing such a filter lowers system costs.

Likewise, by filtering maintenance packets to identify flow control packets, monitoring may be accomplished to determine whether all allocated flow control credits are being consumed and returned, and the rate of return. When credits from a given computing device are not being returned, or not being returned at a desirable rate (as compared with other system devices), flow control credits may be reallocated to other devices, thereby making use of bandwidth which would otherwise go unused (for example, when the device to which it is allocated is down or no longer needs as much bandwidth).

Figure 1:
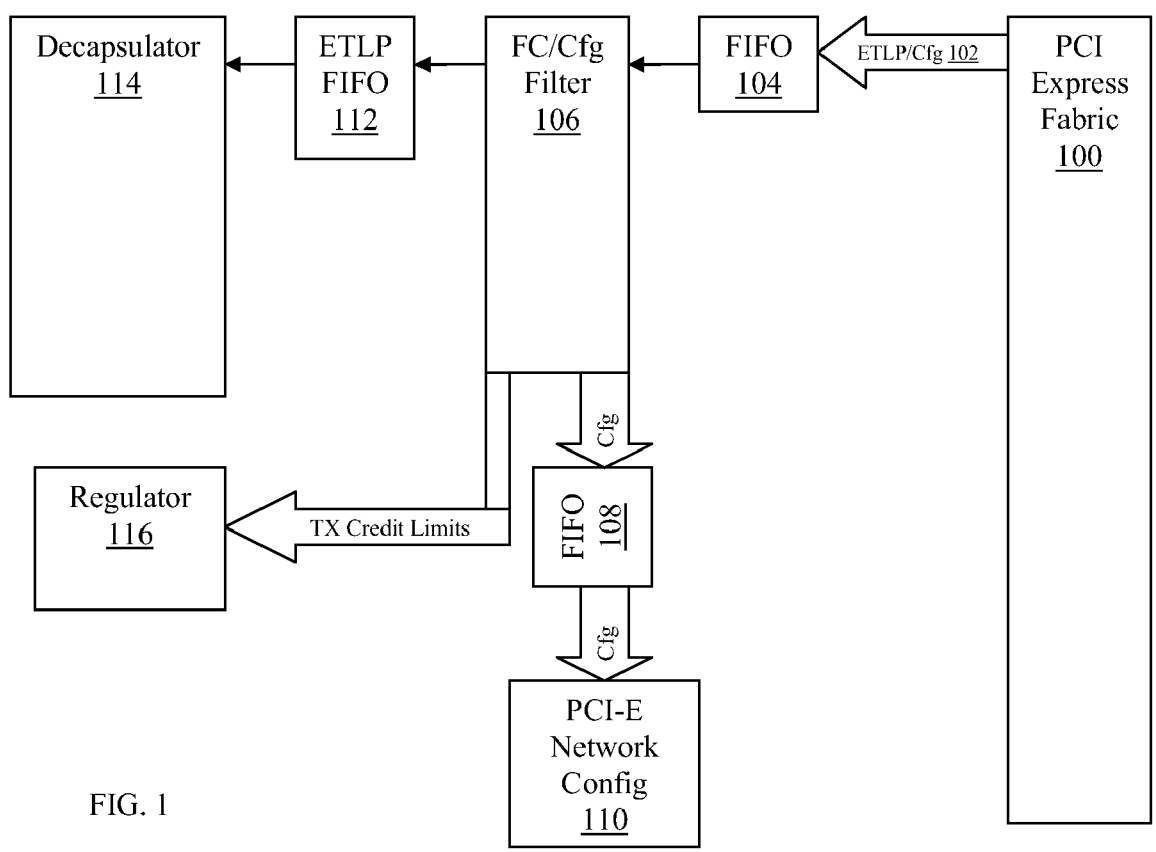
FIG. 1 shows a block diagram of a system in accordance with various embodiments of the present disclosure.

Referring now to FIG. 1, a system fabric 100, such as a PCI Express fabric, is shown. The system fabric 100 couples together a plurality of computing devices in the system. The system fabric 100 transfers data packets 102, including encapsulated transaction layer packets (ETLP) and maintenance packets such as native configuration cycles (CFG) and buffer flow control packets' (BFCP). A first-in, first-out ("FIFO") buffer 104 intercepts the inbound stream of packets 102. A filter 106 serves various purposes, including to intercept and redirect configuration cycles and BFCP in the inbound packet stream, distinguish such packets from ETLP for processing, and perform error processing.

Specifically, the filter 106 examines inbound header information to determine whether the packet is an ETLP, a BFCP, or a native configuration request. The filter 106 forwards configuration requests to a FIFO buffer 108 and onward to the Network Configuration module 110 for appropriate processing. The filter 106 intercepts BFCP, and encodes such information into an appropriate transmission (TX) credit limit update that is provided to the regulator 116, and thereby the encapsulator (not shown) at the other end of the fabric 100. The filter 106 allows ETLPs to pass to another FIFO buffer 112 to the decapsulator 114 associated with the destination buffer. Finally, at the conclusion of packet processing, the filter 106 performs error correction by verifying the End-to-End Cyclic Redundancy Check (CRC) value (if present), and flagging an error if the value is incorrect.

Figure 2B:
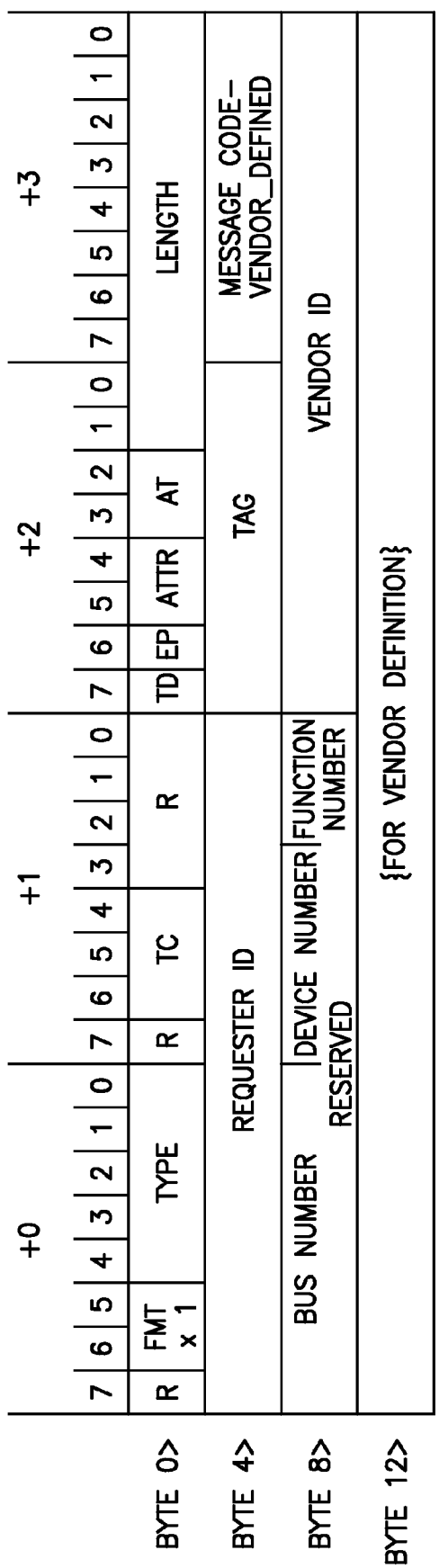

FIG. 2 shows a chart illustrating various packet header bytes in accordance with various embodiments of the present disclosure. Each packet, regardless of the type as described above, includes a header with a plurality of bytes that provide information about the packet. The header contains, for example, source and destination addresses as well as data that describe the content of the message. Certain relevant bytes in the header may be utilized by the filter of the present disclosure in order to keep certain types of packets from blocking critical data paths. As shown in FIG. 2A, the standard for PCI-Express defines byte 0 as the format-type field. Vendor specific encapsulated packets use the "Message routed by ID with data" (MsgIDD) format-type. Standard PCI-Express defines byte 7 as the message code field. Vendor specific encapsulated packets use the "Vendor-defined message code type 0". FIG. 2B is a figure showing the standard PCI-Express vendor-defined message packet. In various embodiments, bytes 10 and 11 store a value reflective of a vendor identifier.

Figure 2C:
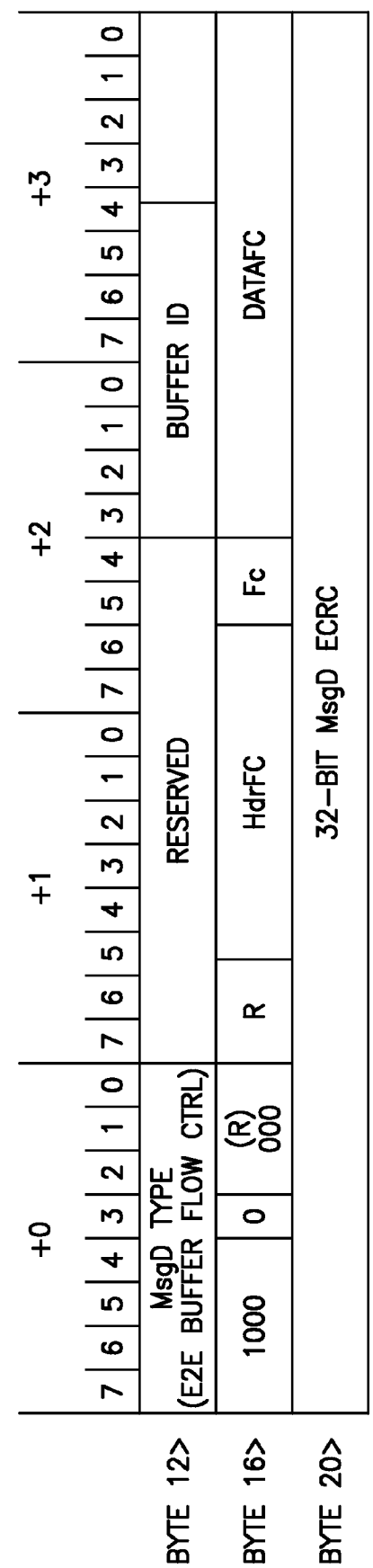

In various embodiments, byte 12 stores a value reflective of whether the packet is a control flow packet (i.e., an internal packet) or an ETLP. By at least one vendor definition, byte 12 can indicate either a "Buffer Flow Control" packet or a "PCI-Express" packet. FIG. 2C shows how HP defines a buffer flow control packet. The "HdrFC" and "DataFC" contain the new credit limits from the receiver, which indicates how much space it has freed up. The little 2-bit field "Fc" indicates what type of space is free (posted, non-posted, and completion).

In various embodiments, bytes 17, 18 and 19 stores a value reflective of the control flow credits allocated and used up with the transfer of the present packet. By examining each of the relevant bytes in the header for message type, the filter is operable to allow through ETLPs while culling out the BCFPs and configuration requests, thereby preventing such packets from impeding traffic of the ETLPs.

Figure 3:
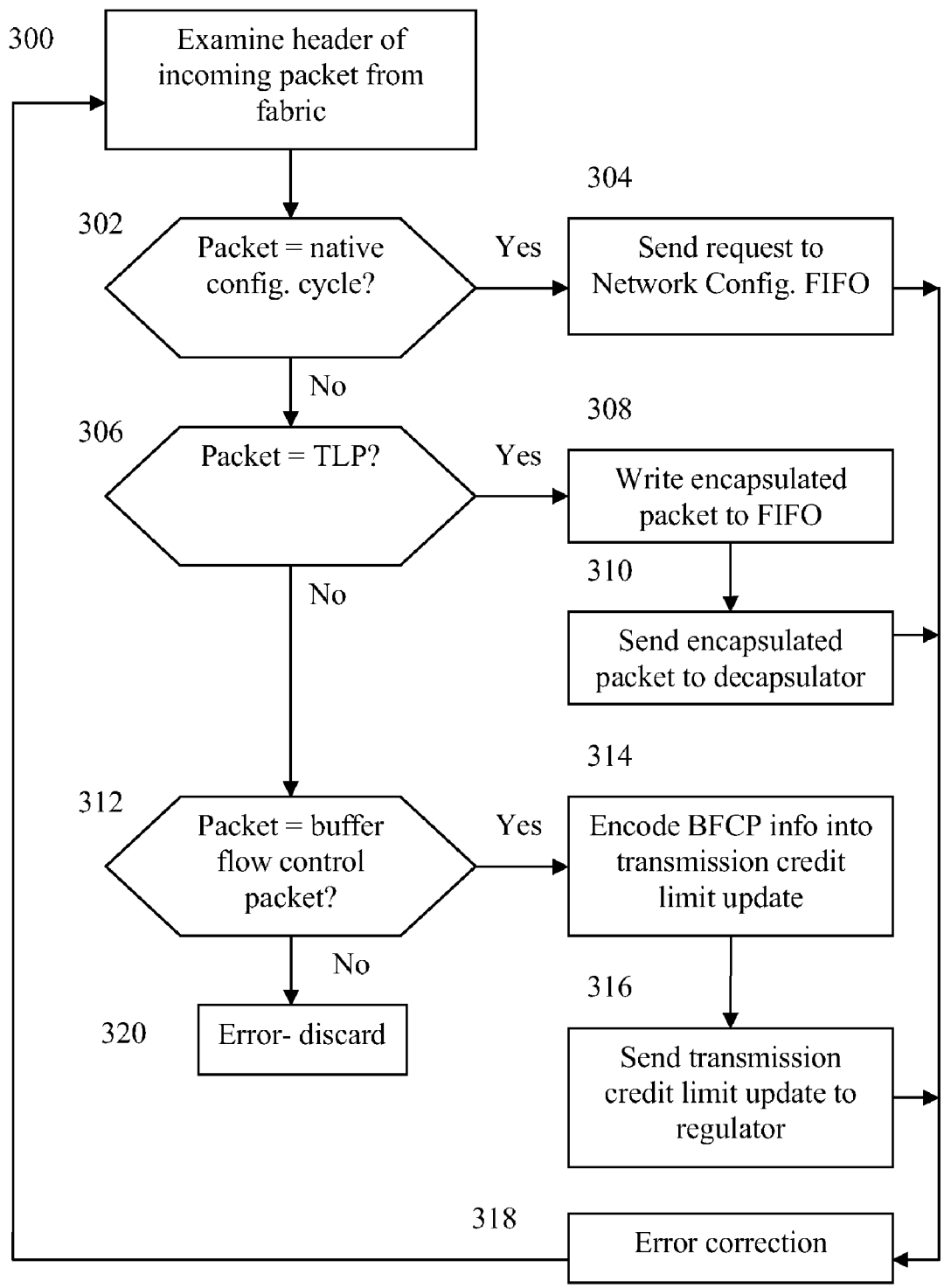
FIG. 3 shows a flowchart for a method of quality of service by control flow packet filtering in accordance with various embodiments of the present disclosure.

Referring now to FIG. 3, a flowchart is shown of an illustrative method of quality of service by control flow packet filtering in accordance with various embodiments. The method begins with examining the header information of a packet that is incoming from the system fabric 100 (block 300). A determination is made of whether the packet is a native configuration request (block 302). In various embodiments, this determination may be made by examining byte 0 for whether the type is a configuration type.

If the packet is a native configuration request, the request is removed from the incoming stream and redirected to the network configuration block 110 by way of the FIFO buffer 108 (block 304). Otherwise, another determination is made as to whether the packet is a transaction layer packet intended for a particular buffer (block 306). In various embodiments, this determination may be made by examining byte 8 for clarification of the message type in combination with examination of bytes 10 and 11, as a vendor identifier match, in combination with a non-control type byte 12 signifies when a packet is a transaction layer packet. When the packet is a transaction layer packet, the encapsulated packet is permitted to pass through the filter 106, and is written to the FIFO 112 (block 308), and then sent on to the decapsulator 114 for the buffer for which the packet is addressed (block 310).

If, at block 306, the packet is not a ETLP, another determination is made in order to evaluate whether the packet is a BFCP (block 312). In various embodiments, this determination may be made by examining bytes 17, 18 and 19, which indicate flow control credit information. Specifically, in various embodiments, each computing device in the system may have a predetermined number of flow control credits allocated for use, indicating the percentage of available bandwidth that may be used by the device. Such allocated number of credits may, in some embodiments, be advertised.

At block 306, when the packet is a BFCP, the information from the packet may be encoded into a transmission credit limit update at block 314, and forwarded to the regulator 316. The regulator may in turn advertise the transmission credit limit update, so that credits may be reallocated, as will be discussed further below with respect to FIG. 4.

The filter 106 may, in some embodiments, additionally include error correction as described above (block 318). In the event that the packet under examination is some unsupported type other than those described herein, an error message is generated and the packet is discarded, thereby preventing the packet from blocking critical data paths (block 320).

Figure 4:
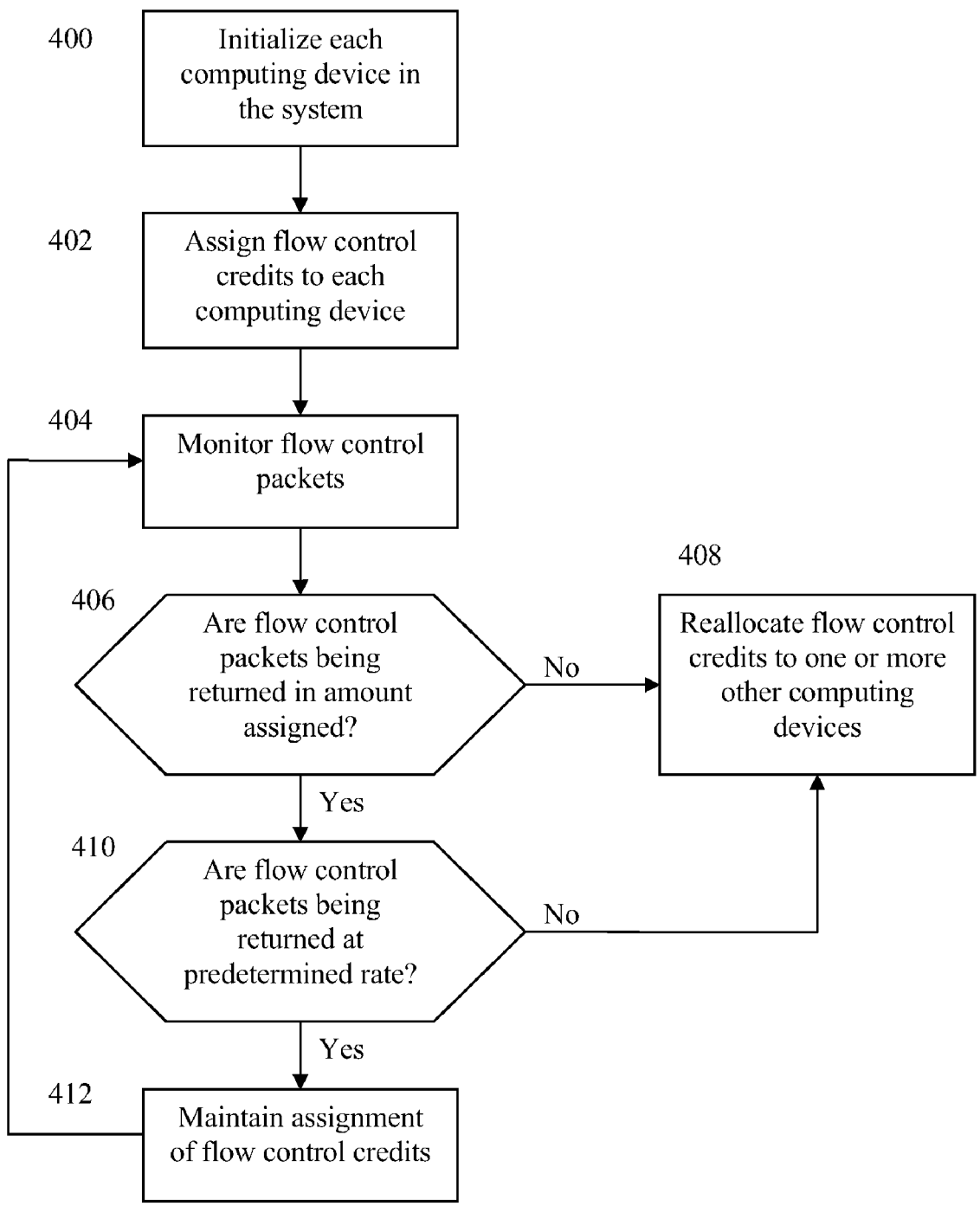
FIG. 4 shows a flowchart for a method of reallocating flow control credit based on filtering of FIG. 3 in accordance with various embodiments of the present disclosure.

Referring now to FIG. 4, a flowchart is shown of an illustrative method of reallocating flow control credit based on filtering of FIG. 3 in accordance with various embodiments. In various embodiments, the filter 106 as described above may additionally be used to improve utilization of available bandwidth by reallocating control flow credits while packets are being transferred. The method for reallocating flow control credit begins with the initialization of each device in the system (block 400). Upon initialization of each device according to start-up procedures appropriate to each device, each device is assigned a predetermined number of flow control credits (block 402). The apportionment of flow control credits comes from the management node. The system administrator can assign the credits equally for each binding or bias them for higher priority bindings.

The filter 106, as described above, monitors the incoming stream of packets for flow control packets (block 404). The filter 106 is operable to determine whether flow control packets are being returned at all (block 406), and whether flow control packets are being returned at the rate for which credits are apportioned for the device (block 408). If flow control packets are not being returned or are not being returned at the rate for which credits are apportioned for the device, the regulator forwards such information so that the flow control credits may be reallocated based on which device has the greatest demand for additional credits (block 408). If the flow control packets are being returned, and at an appropriate rate, the assignment of credits is maintained (block 410).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a fabric coupling together a plurality of computing devices, wherein the fabric transfers a stream of packets between the computing devices;
   each computing device comprising:
   a Quality of Service ("QOS") filter that monitors incoming packets to filter out packets of a maintenance type and permit transfer of packets of a transaction type.

2. The system according to claim 1, wherein packets of the maintenance type comprise at least one of 1) flow control type packets and 2) configuration type packets.

3. The system according to claim 2, each computing device further comprising a network configuration module that processes configuration type packets; and wherein the QOS filter redirects packets of the maintenance type to the network configuration module when the packets comprise configuration type packets.

4. The system according to claim 2, each computing device further comprising a regulator that determines the rate at which allocated flow control credits are consumed; and wherein the QOS filter redirects packets of the maintenance type to the regulator when the packets comprise flow control type packets.

5. The system according to claim 4, wherein the regulator assigns a predetermined amount of flow control credit for the device; and when predetermined amount of flow control credit is not consumed and returned, the regulator reallocates at least some of the predetermined amount of flow control credit to another computing device.

6. The system according to claim 1, each computing device further comprising a decapsulator that decapsulates transaction type packets for processing at the device; and wherein the QOS filter permits transfer of transaction type packets.

7. The system according to claim 1, wherein the QOS filter intercepts a packet in the stream of packets and examines the header of the packet to determine the type of the packet.

8. The system according to claim 1, wherein the QOS filter performs error correction.

9. A filtering apparatus, comprising:
   means for monitoring a stream of packets between a plurality of computing devices by a fabric;
   means for filtering out packets of a maintenance type; and
   means for permitting transfer of packets of a transaction type.

10. The filtering apparatus according to claim 9, further comprising means for examining a header each packet in the stream of packets to determine the type of each packet.

11. The filtering apparatus according to claim 9, wherein packets of the maintenance type comprise at least one of 1) flow control type packets and 2) configuration type packets.

12. The filtering apparatus according to claim 11, further comprising means for redirecting packets of the maintenance type to the network configuration module when the packets comprise configuration type packets, and processing configuration type packets.

13. The filtering apparatus according to claim 11, further comprising means for redirecting packets of the maintenance type to the regulator when the packets comprise flow control type packets and determining the rate at which allocated flow control credits are consumed.

14. The filtering apparatus according to claim 9, further comprising
   means for assigning a predetermined amount of flow control credit; and
   means for reallocating at least some of the predetermined amount of flow control credit to another computing device when predetermined amount of flow control credit is not consumed and returned.

15. The filtering apparatus according to claim 9, further comprising means for permitting transfer of transaction type packets and decapsulating transaction type packets for processing.

16. A method, comprising:
   transferring a stream of packets between a plurality of computing devices by a fabric;
   monitoring the stream of incoming packets;
   filtering out packets of a maintenance type; and
   permitting transfer of packets of a transaction type.

17. The method according to claim 16, wherein monitoring the stream of incoming packets further comprises examining a header each packet in the stream of packets to determine the type of each packet.

18. The method according to claim 16, wherein packets of the maintenance type comprise at least one of 1) flow control type packets and 2) configuration type packets.

19. The method according to claim 18, further comprising redirecting packets of the maintenance type to the network configuration module when the packets comprise configuration type packets, and processing configuration type packets.

20. The method according to claim 18, further comprising redirecting packets of the maintenance type to the regulator when the packets comprise flow control type packets and determining the rate at which allocated flow control credits are consumed.

21. The method according to claim 16, further comprising permitting transfer of transaction type packets and decapsulating transaction type packets for processing.

22. The method according to claim 16, performing error correction.

23. The method according to claim 16, further comprising:
   assigning a predetermined amount of flow control credit; and
   when predetermined amount of flow control credit is not consumed and returned, reallocating at least some of the predetermined amount of flow control credit to another computing device.

* * * * *